(12) United States Patent
Arnone et al.

(10) Patent No.: US 12,050,610 B2
(45) Date of Patent: Jul. 30, 2024

(54) MANAGEMENT OF METADATA GROUPS AND ASSOCIATED WORKFLOWS

(71) Applicant: JPMorgan Chase Bank, N.A., New York, NY (US)

(72) Inventors: Joseph Arnone, Swedesboro, NJ (US); Simon Clarke, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/965,382

(22) Filed: Oct. 13, 2022

(65) Prior Publication Data

US 2023/0123965 A1    Apr. 20, 2023

Related U.S. Application Data

(60) Provisional application No. 63/255,856, filed on Oct. 14, 2021.

(51) Int. Cl.
  *G06F 16/00*    (2019.01)
  *G06F 9/30*    (2018.01)
  *G06F 9/54*    (2006.01)
  *G06F 16/2457*    (2019.01)

(52) U.S. Cl.
  CPC ...... *G06F 16/24573* (2019.01); *G06F 9/3005* (2013.01); *G06F 9/541* (2013.01)

(58) Field of Classification Search
  CPC ... G06F 16/24573; G06F 9/3005; G06F 9/541
  USPC .................................................. 707/600–899
  See application file for complete search history.

(56) References Cited

U.S. PATENT DOCUMENTS

| | | | |
|---|---|---|---|
| 5,754,857 A * | 5/1998 | Gadol | G06Q 10/10 709/226 |
| 9,990,636 B1 * | 6/2018 | Lewis | G06Q 30/016 |
| 2007/0067373 A1 * | 3/2007 | Higgins | G06Q 30/00 |
| 2021/0158234 A1 * | 5/2021 | Sivasubramanian | G10L 15/26 |

* cited by examiner

*Primary Examiner* — Irete F Ehichioya
*Assistant Examiner* — Shirley D Hicks
(74) *Attorney, Agent, or Firm* — Greenblum & Bernstein, P.L.C.

(57) ABSTRACT

Implementations generally relate to management of metadata groups and associated workflows. In some implementations, a method includes receiving a workflow request, wherein the workflow request includes information associated with a metadata group. The method further includes providing a workflow list of available workflows based on the metadata group. The method further includes receiving a selection of a workflow from the workflow list. The method further includes providing the workflow and a form associated with the workflow.

20 Claims, 5 Drawing Sheets

MANAGEMENT OF METADATA GROUPS AND ASSOCIATED WORKFLOWS

CROSS-REFERENCE TO RELATED APPLICATIONS

This application is based upon and claims the benefit of priority from U.S. Provisional Application No. 63/255,856, filed on Oct. 14, 2021, the entire contents of which are incorporated herein by reference.

BACKGROUND

Financial technology (Fintech) is an emerging industry that uses technology to improve activities in finance. For example, Fintech may provide applications for data management. Conventional data management systems typically manage metadata groups using a bespoke application that is executed within a conventional data management application.

Figure 1:
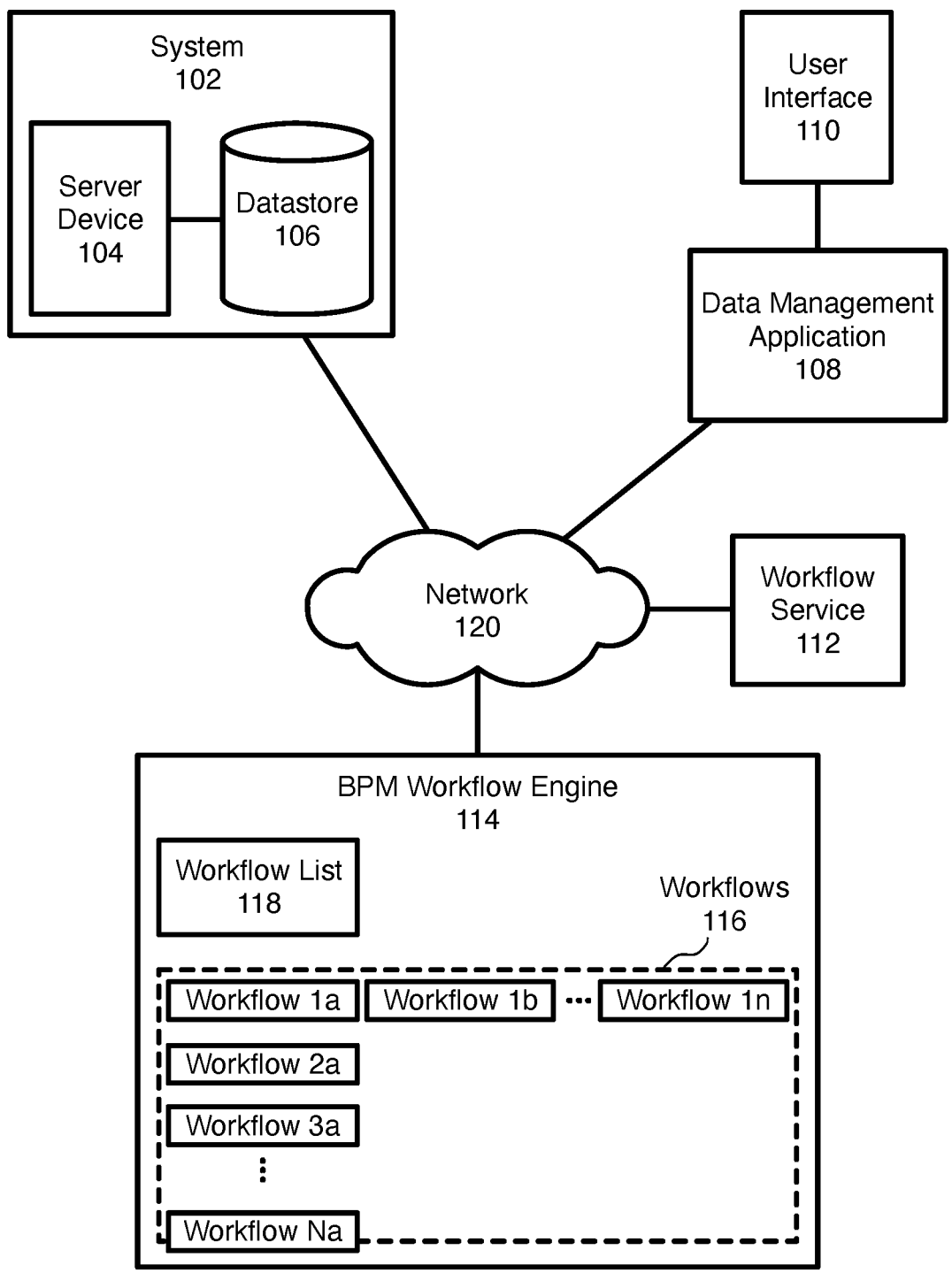
FIG. 1 is a block diagram of an example a metadata group management environment 100 for managing metadata groups and associated workflows, which may be used for implementations described herein.

Advantages and features of the disclosure will be rendered by reference to specific examples thereof which are illustrated in the appended drawings. The drawings illustrate only particular examples of the disclosure and therefore are not to be considered to be limiting of its scope. The principles herein are described and explained with additional specificity and detail through the use of the accompanying drawings.

DETAILED DESCRIPTION

Implementations described herein enable, facilitate, and manage metadata groups in a financial environment. Implementations enable data management systems to utilize business data as enterprise assets across an organization. For example, implementations facilitate metadata management, metadata usage, and metadata discovery, which may involve metadata semantics and statistics. Implementations may also provide a data management portal and user interface for managing such metadata.

Conventional data management systems typically use bespoke applications that are effectuated within a traditional data management application. Business process owners cannot readily update the metadata group management application. Changes to a conventional data management system require time-consuming modifications by application developers and redeployment of the data management application. Such modifications are not possible for business process owners with conventional solutions.

Implementations described herein address these issues and provide various other benefits. In contrast to conventional data management systems, implementations enable business process owners to create and modify business process management (BPM) metadata groups for accessing and utilizing workflows without any code changes to a data management application.

As described in more detail herein, in various implementations, a system receives a workflow request, where the workflow request includes information associated with a metadata group. The metadata group may be associated with a particular business unit such as a credit card business unit, mortgage business unit, etc. The system then provides a workflow list of available workflows based on the metadata group. The available workflows contain business process requirements that comply with the needs of the corresponding business units. The system receives a selection of a workflow from the workflow list. The system then provides the workflow and a form associated with the workflow. The form complies with the requires of the corresponding business unit and is to be filled out by an end user.

Reference will now be made in detail to the examples of the disclosure, which are illustrated in the accompanying drawings. While the disclosure will be described in conjunction with the examples, it will be understood that the examples are not intended to limit the disclosure to these examples. On the contrary, the disclosure is intended to cover alternatives, modifications and equivalents which may be included within the spirit and scope of the disclosure. Furthermore, in the following detailed description of the present disclosure, numerous specific details are set forth to provide a thorough understanding of the present disclosure. However, it will be obvious to one of ordinary skill in the art that the present disclosure may be practiced without these specific details. In other instances, well-known methods, procedures, components, and circuits have not been described in detail as to not unnecessarily obscure aspects of the present disclosure.

FIG. 1 is a block diagram of an example metadata group management environment 100 for managing metadata groups and associated workflows, which may be used for implementations described herein. As shown, metadata group management environment 100 includes a system 102, which includes a server device 104 and a datastore 106.

Metadata group management environment 100 also includes a data management application 108, which has an associated user interface (UI) 110. As shown, metadata group management environment 100 also includes a workflow service 112 and a business process management (BPM) workflow engine 114, which creates and manages workflows 116 and a corresponding workflow list 118 of available workflows 116.

As described in more detail herein, system 102 generates data sets or metadata groups (not shown) and associates the metadata groups with workflows 116 using BPM workflow engine 114, which is separate from and independent of the consuming data management application 108. Data management application 108, workflow service 112 and BPM workflow engine 114 may communicate with system 102 and/or may communicate with each other directly or via system 102 via a network 120. Network 120 may be any suitable communication network such as a Wi-Fi® network, Bluetooth® network, the Internet, etc.

While system 102 performs implementations described herein, in other implementations, any suitable component or combination of components associated with system 102 or any suitable processor or processors associated with system 102 may facilitate performing the implementations described herein.

As described in more detail herein, metadata group management system 100 creates and manages metadata groups associated with various workflow processes or workflows 116. Also, in various implementations, BPM workflow engine 114 operates independent of the consuming data management application 108.

In various implementations, UI 110 interface allows user access to data management application 108. UI 110 enables a user to interact with data management application 108 to access, manage, and use workflows 116. User interface 110 may be displayed on any suitable computing device such as a desktop computer, a laptop computer, or a tablet device, among others.

In various implementations, metadata group management is effectuated through an associated workflow processes using BPM workflow engine 114. Metadata group management system 100 also includes a workflow service 112. In various implementations, workflow service 112 may be a facade service in that data management application 108 may interact with workflow service 112 instead of interacting directly with BPM workflow engine 114. In various implementations, BPM workflow engine 114 is positioned behind workflow service 112. This enables changes to BPM workflow engine 114. For example, BPM workflow engine 114 may be upgraded or may be swapped with a new BPM workflow engine. BPM workflow engine 114 may be integrated into system 102 or may be implemented by a third-party resource with minimal impact on the performance of the data management application.

Workflow service 120 may provide a simplified application programming interface (API) to the data management application 108. Also, the API may be implemented such that BPM workflow engine 114 and/or the workflows 116 of BPM workflow engine 114 may be changed without changing data management application 108 and without changing the UI 110 of data management application 108.

In various implementations, the complexity of workflows may range from simple to complex. For example, a default or generic workflow may be a public workflow with no need for approval. For example, such a simple workflow may be a workflow for initially setting up a user account at a bank, and such a workflow may be fully automated. A more complex workflow may require an approval step. For example, a workflow for applying for a credit card may require a credit check before completing a credit card application or form. Yet, a more complex workflow may require several approvals. For example, a mortgage loan form may require an approval by a loan officer and an approval by an underwriter, among approvals by others. The number of requirements and the particular requirements may vary, depending on the particular business unit requirements.

In various implementations, BPM workflow engine 114 may contain various types of workflows 116 such as Workflows 1a-Na, as shown. The various workflows 116 may be generic or specific workflows associated with a metadata group creation. Also, the workflows 116 of BPM workflow engine 114 may represent various business processes. For example, a workflow may be a financial process such as setting up an initial user account. In another example, a workflow may be a financial process such as the evaluation of an application for credit. A workflow may include a series of steps, which may include one or more approvals, for example. The workflows may be accessed and modified through BPM workflow engine 114.

In various implementations, BPM workflow engine 114 is separated from and independent of data management application 108. As such, BPM workflow engine 114 allows workflows to be enabled, disabled, and modified without modifying and/or updating data management application 108.

BPM workflow engine 114 may also contain multiple workflow instances of a given workflow such as workflow instances 1a-1n, as shown. As indicated above, the various workflows 116 may be generic or specific workflows associated with a metadata group creation. In various implementations, an instance of a given workflow may reflect a variation of the workflow. For example, one instance of a given workflow may be a basic, generic or default workflow. A second instance may be the same default workflow but with modifications. For example, a first workflow instance may be a workflow for initially setting up a new user account, where a second workflow instance is the first workflow instance but modified to include particular user preferences.

In another example, a second workflow instance may be a workflow associated with processing a loan application, where a second workflow instance is the first workflow instance but modified to include one or more added validation steps to the loan application process. Accordingly, different workflow instances may overlap in their requirements. The particular variations of the workflow instances may vary, depending on the particular implementation. For example, a process step may be removed or deleted from a workflow instance, resulting in a second workflow instance.

In another example, a workflow instance may have an added requirement that the workflow process not be deleted, or that a particular requirement of a given workflow may not be deleted, or that a particular piece of information may not be deleted. For example, if a particular user is a member of a bank, a policy may be to not permit certain information such as user name, address, social security number, etc. to be deleted. This is because this information may be required for user-related queries. In some scenarios, a particular person might not be a member of the bank, and, as such, the name of the user may be permitted to be deleted.

In some implementations, BPM workflow engine 114 may be implemented in a third-party workflow platform. This enables various financial institutions to benefit from implementations described herein.

In various implementations, datastore 106 stores metadata groups created by BPM workflow engine 114. BPM workflow engine 114 accesses stored metadata groups in datastore 106 and makes the metadata groups accessible to authorized users through data management application 108. In some implementations, BPM workflow engine 114 may create a group authorization workflow that manages how records of datastore 106 are accessed and edited.

For ease of illustration, FIG. 1 shows one block for each of system 102, server device 104, datastore 106, data management application 108, UI 110, workflow service 112, BPM workflow engine 114, and datastore 106. Blocks 102, 104, 106, 108, 110, 112, and 114 may each represent multiple respective systems, server devices, datastores, data management applications, UIs, workflow services, and BPM workflow engines. In other implementations, metadata group management environment 100 may not have all of the components shown and/or may have other elements including other types of elements instead of, or in addition to, those shown herein.

Figure 2:
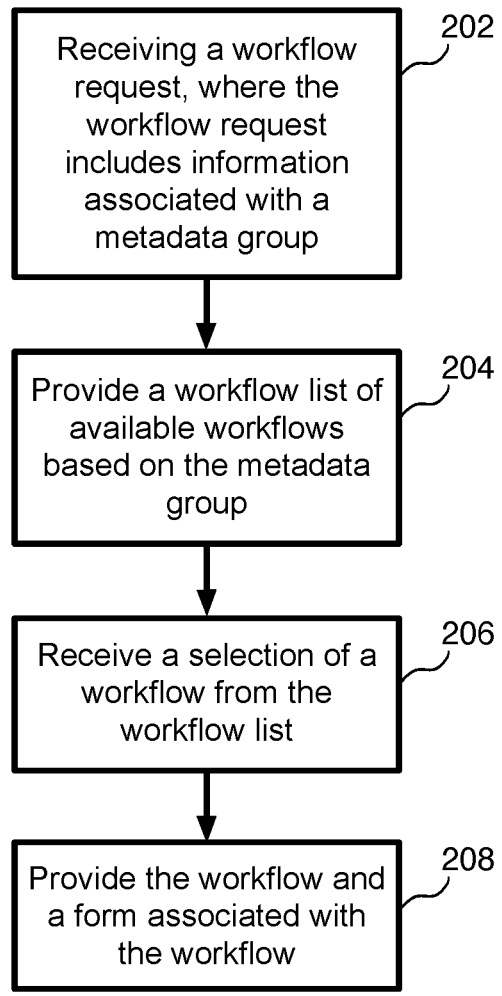
FIG. 2 is an example flow diagram for managing metadata groups and associated workflows, according to some implementations.

FIG. 2 is an example flow diagram for managing metadata groups and associated workflows, according to some implementations. Referring to both FIGS. 1 and 2, a method is initiated at block 202, where a system such as system 102 receives a workflow request. In various implementations, the workflow request includes information associated with a metadata group. In UI 110, the user who is consuming information from datastore 106 via BPM workflow engine sees a list of the metadata groups if the user is authorized to look at the particular group. For example, if the user works for a credit card business unit, the system may permit the user to view metadata groups associated with that business unit, but the system might not permit the user to view metadata groups associated with the mortgage business unit.

In various implementations, the metadata group is associated with a business unit. For example, the metadata group may be associated with a banking business unit, a credit card business unit, a mortgage business unit, etc. A metadata group may include, for example a group name, a group description, a usage type, an owner designation, among others. A metadata group may also include other sets of data locations of data elements (e.g., user profile information, degrees of confidentiality, whether a given metadata group is intended for public access, private access, etc.).

In various implementations, the metadata group is associated with one or more business process requirements. For example, the business process requirements may include required information such as user legal name, address, social security number, etc. In various implementations, the business unit (e.g., credit, mortgage, etc.) or whoever created the metadata group is the owner of the metadata group. In various implementations, the owner of the elements of the metadata may be the owner of the datastore that stores such elements.

At block 204, the system provides workflow list 118, which lists available workflows 116 based on the metadata group. In various implementations, each workflow of the workflow list of available workflows is associated with one or more metadata groups. In other words, a given workflow may be associated with multiple different metadata groups and used by multiple different corresponding business units. In various implementations, data management application 108 may access BPM workflow engine 114 to provide workflow list 118 of available workflows (e.g., workflows 116). In some implementations, as the available workflows change due to some being added or removed, the system automatically, without user intervention, updates the workflow list. No change to data management application 108 is required.

At block 206, the system receives a selection of a workflow from the workflow list. In this step, the user may view a list of the available workflows and selects one.

At block 208, the system provides the workflow and a form associated with the workflow. The available workflows may be available to a user in real time as workflows 116 are created by BPM workflow engine 114. Implementations provide metadata group management logic and the form for data intake. These logic and forms are associated with and effected through the workflows 116 from within BPM workflow engine 114.

In various implementations, the form associated with the workflow complies with one or more business process requirements associated with the metadata group.

In various implementations, the workflow request is received from a data management application. The workflow and the form associated with the workflow are provided by a workflow engine. Also, as indicated herein, the workflow engine is separate from the data management application. As indicated herein, BPM workflow engine 114 generates, stores, and provides such workflows dynamically without requiring any updating of data management application 108.

In some implementations, the BPM workflow engine 114 generates the form. In some implementations, the BPM workflow engine 114 sends required workflow metadata to data management application 108. This enables data management application 108 to dynamically build a form that will be required for an end user to fill out.

Figure 3:
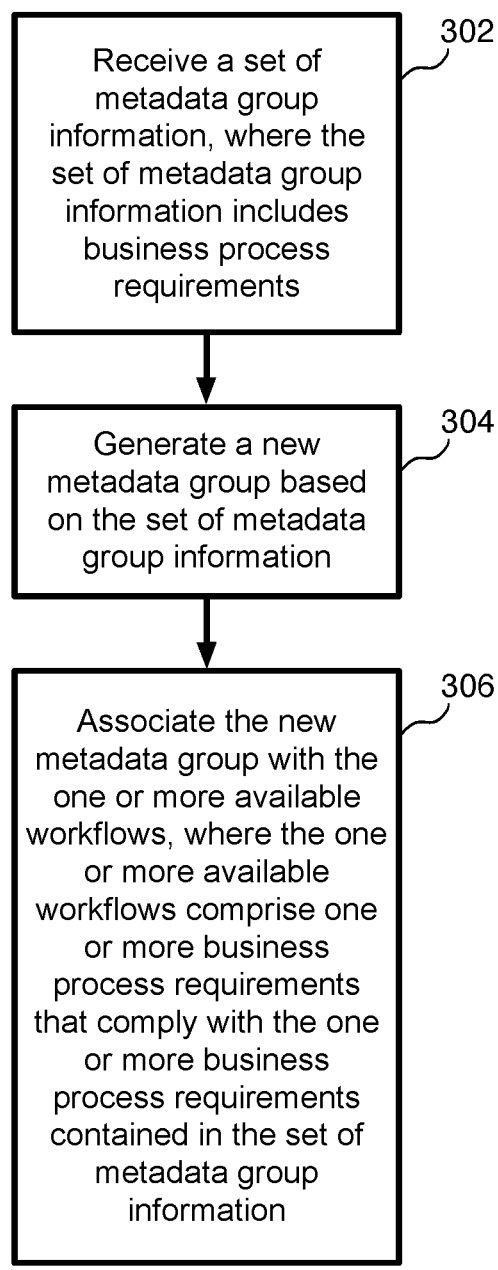
FIG. 3 is an example flow diagram for generating new metadata groups and associated workflows, according to some implementations.

FIG. 3 is an example flow diagram for generating new metadata groups and associated workflows, according to some implementations. This example flow diagram may be used to generate any new metadata groups and associated workflows to enable the flow diagram of FIG. 1. Referring to both FIGS. 1 and 3, a method is initiated at block 302, where a system such as system 102 receives a set of metadata group information. In various implementations, the metadata group information may include a group name, a description, a metadata group type indicating whether public or risk related, a creator of metadata group (e.g., requestor of the metadata group), etc.

In various implementations, the set of metadata group information includes one or more business process requirements. At block 304, the system generates a new metadata group based on the set of metadata group information. At block 306, the system associates the new metadata group with the one or more available workflows. In various implementations, the available workflows include one or more business process requirements that comply with the business process requirements contained in the set of metadata group information.

In various implementations, the system may receive a set of metadata group information, including one or more business process requirements. If no preexisting workflow exists that includes business process requirements corresponding to those contained in the set of metadata group information, the system may generate a new workflow based on the one or more business process requirements contained in the set of metadata group information. The system then associates the metadata group with the new workflow.

The user may change or modify the workflow to create a particular user-specified instance of a workflow. In various implementations, if a user modifies metadata associated with a preexisting metadata group, the system may generate a new metadata group and generate a new workflow, both based on the modified set of metadata group information. For example, if the user changes the metadata group type to a risk-group, BPM workflow engine 114 may generate a new workflow that includes one or more approvals. Alternatively, in some implementations, BPM workflow engine 114 may take an existing workflow with no approvals and modify a copy of the workflow and add one or more approval steps. In other words, BPM workflow engine 114 may create new workflows or modify preexisting workflows.

In some implementations, a given workflow instance may reflect a variation of an initial workflow based upon user preferences, for example. In some implementations, a form may be dynamically presented to the user so that the user can provide the required metadata.

The instance of the workflow may reflect the specific input provided by the user. As a result, BPM workflow engine 114 contains the additional workflow instance.

In various implementations, the system stores metadata groups, workflows, and forms in any suitable datastore such as datastore 106. The system may store metadata groups, workflows, and forms together in the same datastore or in separate designated datastores (e.g., metadata group datastore, workflow datastore, form datastore, etc.).

In some implementations, a combination of related metadata groups, workflows, and/or forms may be associated with a group record, which is stored in a suitable datastore such as datastore 106. In various implementations, the system makes the stored group record accessible by any authorized users of consuming data management applications such as data management application 108. In some implementations, authorizations to access particular group records may be managed by a particular workflow of BPM workflow engine 114.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations enable the generation of workgroups, workflows, and associated forms, and provides these items to authorized users using a BPM workflow engine. The BPM workflow engine is separate from a data management application, which enables updates (e.g., additions, deletions, and changes) to workgroups, workflows, and associated forms separately from and independently from the data management application. This enables conventional management by business units without requiring any updating of the data management application.

The non-transitory computer-readable storage medium 200 may be any electronic, magnetic, optical, or other physical storage device that stores executable instructions. For example, the non-transitory computer-readable storage medium 200 may be a random-access memory (RAM), an electrically-erasable programmable read-only memory (EEPROM), a storage drive, an optical disc, or the like. The non-transitory computer-readable storage medium 200 can be encoded to store executable instructions that cause a processor to perform operations according to examples of the disclosure.

Figure 4:
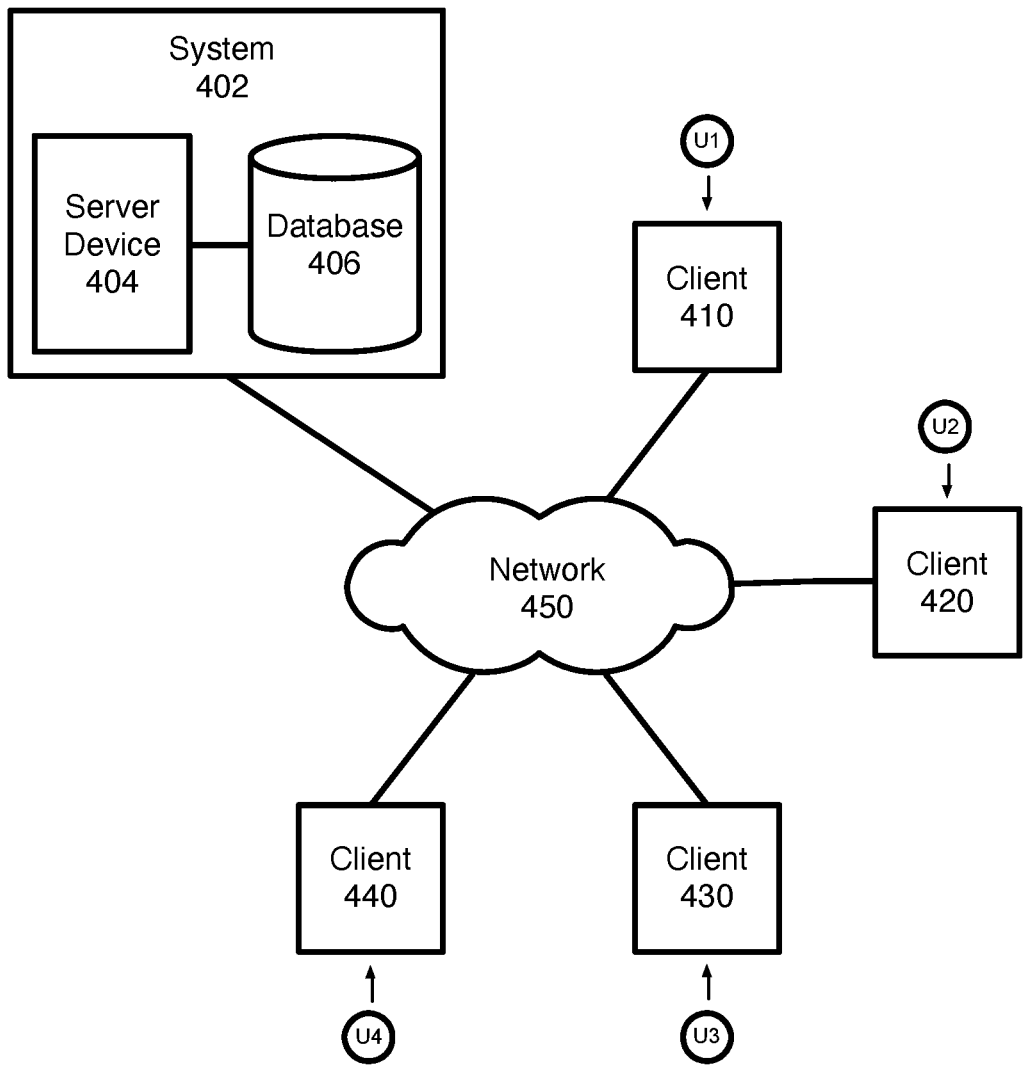
FIG. 4 is a block diagram of an example network environment, which may be used for some implementations described herein.

FIG. 4 is a block diagram of an example network environment 400, which may be used for some implementations described herein. In some implementations, network environment 400 includes a system 402, which includes a server device 404 and a database 406. For example, system 402 may be used to implement system 102 of FIG. 1, as well as to perform implementations described herein. Network environment 400 also includes client devices 410, 420, 430, and 440, which may communicate with system 402 and/or may communicate with each other directly or via system 402. Network environment 400 also includes a network 450 through which system 402 and client devices 410, 420, 430, and 440 communicate. Network 450 may be any suitable communication network such as a Wi-Fi® network, Bluetooth® network, the Internet, etc.

For ease of illustration, FIG. 4 shows one block for each of system 402, server device 404, and network database 406, and shows four blocks for client devices 410, 420, 430, and 440. Blocks 402, 404, and 406 may represent multiple systems, server devices, and network databases. Also, there may be any number of client devices. In other implementations, environment 400 may not have all of the components shown and/or may have other elements including other types of elements instead of, or in addition to, those shown herein.

While server device 404 of system 402 performs implementations described herein, in other implementations, any suitable component or combination of components associated with system 402 or any suitable processor or processors associated with system 402 may facilitate performing the implementations described herein.

In the various implementations described herein, a processor of system 402 and/or a processor of any client device 410, 420, 430, and 440 cause the elements described herein (e.g., information, etc.) to be displayed in a user interface on one or more display screens.

Figure 5:
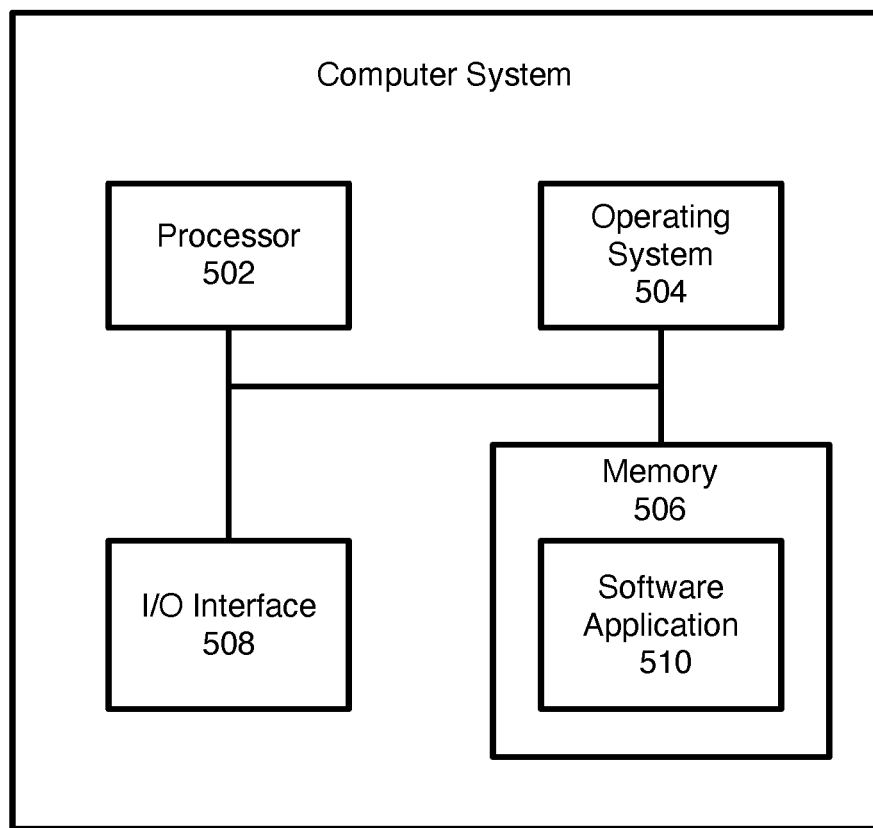
FIG. 5 is a block diagram of an example computer system, which may be used for implementations described herein.

FIG. 5 is a block diagram of an example computer system 500, which may be used for some implementations described herein. For example, computer system 500 may be used to implement server device 404 of FIG. 4 and/or system 102 of FIG. 1, as well as to perform implementations described herein.

In various implementations, computer system 500 may operate with any one or more metadata group management modules associated with data management application 108 and/or BPM workflow engine 114 of FIG. 1 to provide workflow selections and specific metadata group inputs for metadata group management according to implementations described herein.

In various implementations, computer system 500 may include any number of computing systems, which may be communicatively coupled to each other in various ways. Computer system 500 may include, or may be a personal computer, a desktop computer, a mobile computer, a laptop computer, a notebook computer, a terminal, a workstation, a server computer, a network device, or any other suitable computing device.

In some implementations, computer system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of computer system 500 or any suitable processor or processors associated with computer system 500 or any suitable system may perform the steps described. Implementations described herein may be carried out on a user device, on a server, or a combination of both.

Operating system 504 may be, or may include, any code designed and/or configured to perform tasks involving controlling or otherwise managing operation of computer system 500. This may include scheduling execution of software programs or enabling software programs or other modules or units to communicate. As an example, operating system 504 may be a commercial operating system. In some implementations, computer system 500 may include a computing device that does not use an operating system, such as a microcontroller, application-specific integrated circuit (ASIC), field-programmable gate array (FPGA), system on a chip (SOC), etc.

Computer system 500 also includes a software application 510, which may be stored on memory 506 or on any other suitable storage location or computer-readable medium. Software application 510 provides instructions that enable processor 502 to perform the implementations described herein and other functions. Software application 510 may also include an engine such as a network engine for performing various functions associated with one or more networks and network communications. The components of computer system 500 may be implemented by one or more processors or any combination of hardware devices, as well as any combination of hardware, software, firmware, etc. Software application 510 may be any executable code, e.g., an application, a program, process, etc. Software application 510 may be executed by processor 502 possibly under control of operating system 504.

I/O interface 508 may operate with any suitable input devices such as a keyboard/keypad, mouse, and/or any suitable output devices such as displays or monitors. A universal serial bus (USB) device or external hard drive may be connected to and/or included in I/O interface 508. Any applicable input/output devices may be connected to computer system 500 via I/O interface 508.

In various implementations, some or all of the systems and/or modules may be implemented and/or provided in other manners, such as by including one or more methods that are implemented at least partially in firmware and/or hardware (e.g., rather than implemented in whole or in part by software instructions that configure a particular processor), including but not limited to one or more ASICs, standard integrated circuits, controllers, microcontrollers, FPGAs, complex programmable logic devices (CPLDs), etc. Some or all of the modules, systems, and data structures may also be stored (e.g., as software instructions or structured data) on a non-transitory computer-readable storage medium, such as a hard disk or flash drive or other non-volatile storage device, volatile or non-volatile memory, a network storage device, or a portable media article to be read by an appropriate drive or via an appropriate connection.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computer system 500 may not have all of the components shown and/or may have other elements including other types of components instead of, or in addition to, those shown herein.

Although a variety of examples and other information are used to explain aspects within the scope of the appended claims, no limitation of the claims should be implied based on particular features or arrangement. Furthermore, although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C #, Java®, JavaScript®, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to cause the one or more processors to perform operations comprising:
   implementing a data management application, a workflow service, and a workflow engine,
   wherein the data management application, the workflow service, and the workflow engine are separate from each other;
   positioning, by the system, the workflow engine on a backend of the workflow service acting as a façade service between the workflow engine and the data management application enabling modifications to the workflow engine via an update or a swap out for a new workflow engine without making code revisions and interface revisions to the data management application;
   receiving, from the data management application, a workflow request, wherein the workflow request includes information associated with a metadata group;
   providing, by the workflow engine to the data management application through the workflow service, a workflow list of available workflows based on the metadata group, wherein the workflows comprise basic, generic, or default workflows;
   receiving, from the data management application, a selection of a workflow from the workflow list; and
   generating, by the workflow engine to the data management application through the workflow service, the workflow and a form associated with the workflow enabling processing and completion of the workflow.

2. The system of claim 1, wherein the workflow request is received from the data management application and wherein the workflow and the form associated with the workflow are provided by the workflow engine.

3. The system of claim 1, wherein the metadata group is associated with a business division.

4. The system of claim 1, wherein the metadata group is associated with one or more business process requirements.

5. The system of claim 1, wherein the form associated with the workflow complies with one or more business process requirements associated with the metadata group.

6. The system of claim 1, wherein the logic when executed is further operable to cause the one or more processors to perform operations comprising:
   receiving a set of metadata group information, wherein the set of metadata group information comprises one or more business process requirements;
   generating a new metadata group based on the set of metadata group information; and
   associating the new metadata group with the one or more available workflows, wherein the one or more available workflows comprise one or more business process requirements that comply with the one or more business process requirements contained in the set of metadata group information.

7. The system of claim 1, wherein the logic when executed is further operable to cause the one or more processors to perform operations comprising:
   receiving a set of metadata group information, wherein the set of metadata group information comprises one or more business process requirements;
   generating a new workflow based on the one or more business process requirements contained in the set of metadata group information; and
   associating the metadata group with the new workflow.

8. A non-transitory computer-readable storage medium with program instructions stored thereon, the program instructions when executed by one or more processors are operable to cause the one or more processors to perform operations comprising:
   implementing a data management application, a workflow service, and a workflow engine,
   wherein the data management application, the workflow service, and the workflow engine are separate from each other;
   positioning, by the system, the workflow engine on a backend of the workflow service acting as a façade service between the workflow engine and the data management application enabling modifications to the workflow engine via an update or a swap out for a new workflow engine without making code revisions and interface revisions to the data management application;
   receiving, from the data management application, a workflow request, wherein the workflow request includes information associated with a metadata group;
   providing, by the workflow engine to the data management application through the workflow service, a workflow list of available workflows based on the metadata group, wherein the workflows comprise basic, generic, or default workflows;
   receiving, from the data management application, a selection of a workflow from the workflow list; and
   generating, by the workflow engine to the data management application through the workflow service, the workflow and a form associated with the workflow enabling processing and completion of the workflow.

9. The computer-readable storage medium of claim 8, wherein the workflow request is received from the data management application and wherein the workflow and the form associated with the workflow are provided by the workflow engine.

10. The computer-readable storage medium of claim 8, wherein the metadata group is associated with a business division.

11. The computer-readable storage medium of claim 8, wherein the metadata group is associated with one or more business process requirements.

12. The computer-readable storage medium of claim 8, wherein the form associated with the workflow complies with one or more business process requirements associated with the metadata group.

13. The computer-readable storage medium of claim 8, wherein the instructions when executed are further operable to cause the one or more processors to perform operations comprising:

receiving a set of metadata group information, wherein the set of metadata group information comprises one or more business process requirements;

generating a new metadata group based on the set of metadata group information; and associating the new metadata group with the one or more available workflows, wherein the one or more available workflows comprise one or more business process requirements that comply with the one or more business process requirements contained in the set of metadata group information.

14. The computer-readable storage medium of claim 8, wherein the instructions when executed are further operable to cause the one or more processors to perform operations comprising:

receiving a set of metadata group information, wherein the set of metadata group information comprises one or more business process requirements;

generating a new workflow based on the one or more business process requirements contained in the set of metadata group information; and associating the metadata group with the new workflow.

15. A computer-implemented method comprising:

implementing a data management application, a workflow service, and a workflow engine, wherein the data management application, the workflow service, and the workflow engine are separate from each other;

positioning, by the system, the workflow engine on a backend of the workflow service acting as a façade service between the workflow engine and the data management application enabling modifications to the workflow engine via an update or a swap out for a new workflow engine without making code revisions and interface revisions to the data management application;

receiving, from the data management application, a workflow request, wherein the workflow request includes information associated with a metadata group;

providing, by the workflow engine to the data management application through the workflow service, a workflow list of available workflows based on the metadata group, wherein the workflows comprise basic, generic, or default workflows;

receiving, from the data management application, a selection of a workflow from the workflow list; and generating, by the workflow engine to the data management application through the workflow service, the workflow and a form associated with the workflow enabling processing and completion of the workflow.

16. The method of claim 15, wherein the workflow request is received from the data management application and wherein the workflow and the form associated with the workflow are provided the workflow engine.

17. The method of claim 15, wherein the metadata group is associated with a business division.

18. The method of claim 15, wherein the metadata group is associated with one or more business process requirements.

19. The method of claim 15, wherein the form associated with the workflow complies with one or more business process requirements associated with the metadata group.

20. The method of claim 15, further comprising:

receiving a set of metadata group information, wherein the set of metadata group information comprises one or more business process requirements;

generating a new metadata group based on the set of metadata group information; and associating the new metadata group with the one or more available workflows, wherein the one or more available workflows comprise one or more business process requirements that comply with the one or more business process requirements contained in the set of metadata group information.

\* \* \* \* \*